Apr. 17, 1923.
F. A. CASS
FISHING LURE
Filed Aug. 24, 1921
1,452,359
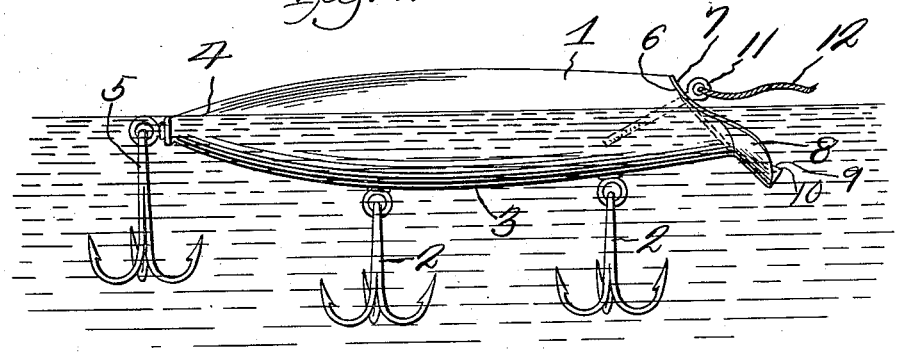
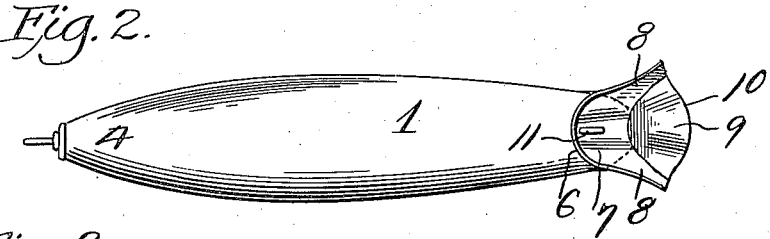
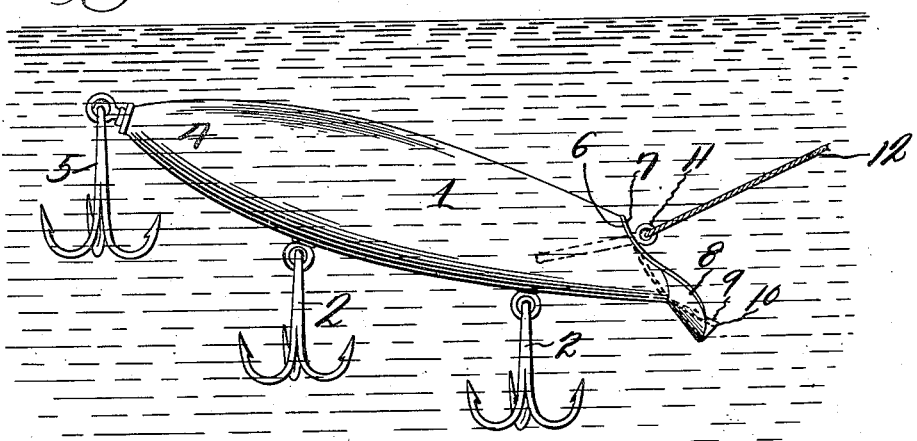
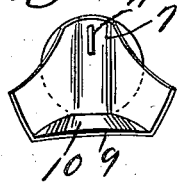 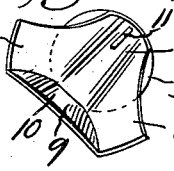 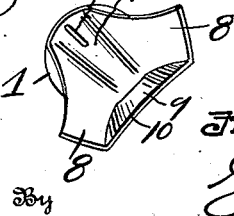
Inventor
Frank Austin Cass,
By
Attorney Patented Apr. 17, 1923.

1,452,359

UNITED STATES PATENT OFFICE.

FRANK AUSTIN CASS, OF SOUTH BEND, INDIANA, ASSIGNOR TO SOUTH BEND BAIT CO., OF SOUTH BEND, INDIANA, A CORPORATION OF INDIANA.

FISHING LURE.

Application filed August 24, 1921. Serial No. 495,127.

*To all whom it may concern:*

Be it known that I, FRANK AUSTIN CASS, a citizen of the United States, residing at South Bend, in the county of St. Joseph and State of Indiana, have invented certain new and useful Improvements in Fishing Lures, of which the following is a specification.

The invention relates to fishing lures, and has for its object to provide a fishing lure which will dive as the same is drawn through the water, and provided with a diving plate adjacent its forward end so constructed that as the lure is pulled through the water, said plate will cause the lure to dive, and also so constructed that as it rolls from side to side in its movement through the water it will be caused to continue to dive by wing members carried by the diving member, which will be positioned at a forwardly and downwardly extending angle to the resistance of the water.

A further object is to provide a diving lure comprising a body having its forward end provided with a downwardly and forwardly extending semi-circular shaped depression, in which depression a similarly shaped diving plate is secured, said diving plate having its lower end extending below the lower side of the body and its sides provided with side wings diverging slightly upwardly and its lower end or bottom portion is slightly arched upwardly, thereby providing a deep diving bait or lure, and also providing a lure which when drawn through the water will wobble to a considerable degree and also roll more or less to either side, and one wherein there will be still presented to the resistance of the water, a portion of the plate angling downwardly which will tend to cause the bait to continue to dive, the side wings presenting a forwardly and downwardly extending plane according to the direction of roll of the bait.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1 is a side elevation of the lure showing the same in the water and positioned to be drawn forwardly and in position to dive.

Figure 2 is a top plan view of the lure.

Figure 3 is a side elevation of the lure, showing the same in diving position.

Figure 4 is a front elevation of the lure showing the position of the diving member and lure when the lure is diving without rolling or wobbling.

Figure 5 is a front elevation of the lure showing the position of the diving member and its wings when the lure rolls to the right.

Figure 6 is a front elevation of the lure showing the position of the diving plate and its wings when the lure rolls to the left.

Referring to the drawings, the numeral 1 designates the body of the lure and 2 hooks suspended to the under side 3 thereof. The rear end 4 of the body 1 is provided with hooks 5. It will be seen that the hooks 2 and 5 will normally maintain the lure in the position shown in Figure 1 when in the water.

The lure is of the diving type and so constructed that as it is drawn through the water it will dive so that the same may be used as deep diving bait, and at the same time so constructed that in its course through the water, that as the bait wobbles or rolls from side to side an inclined diving plane will at all times be presented to the resistance of the water at an angle whereby the bait will continue to dive. To accomplish the above result the forward end of the body 1 is provided with a centrally downwardly and forwardly inclined semicircular recess 6, in which recess a similarly shaped diving plate 7 is secured. The diving plate 7 is formed from thin metal longitudinally dished to fit the recess 6, and provided with oppositely disposed wings 8 diverging slightly upwardly and a bottom portion 9 which is slightly arched as at 10 from its forward edge. Said plate as a whole forms a deep diving bait, and as the bait is drawn through the water, the same will wobble to a considerable extent as shown in Figures 5 and 6, and also roll as shown in said figures. As the bait rolls in one direction or the other to a considerable degree, there will be still presented to the resistance of the water a portion of the plate angling downwardly and forwardly which will tend to cause the bait to continue to dive. When the bait is diving and rolls to the right as shown in Figure 5, the lower wing 8 will cause the bait to continue to dive, however when the bait rolls to the position shown in Figure 6, the lower wing 8 will be positioned to cause the bait to continue to dive. By referring to Figure 3 it will be seen that when the bait is diving in normal position that an inclined surface is presented to the resistance of the water, and that no matter in which direction the bait rolls or wobbles, an inclined surface will continue to be presented to the resistance of the water.

Extending through the diving plate 7 is an eye bolt 11, to which bolt a fishing line 12 is secured in such a manner that the lure as a whole may be drawn through the water.

The invention having been set forth what is claimed as new and useful is:—

1. A diving fishing lure comprising a body having a downwardly and forwardly inclined recess in its forward end, a diving plate disposed in said recess and longitudinally dished, the lower end of said diving plate terminating in a slightly upwardly arched portion, and upwardly extending and outwardly diverging diving wings having substantially plane water resisting surfaces carried by said diving plate and forming means whereby the lure will continue to dive as it rolls from side to side.

2. A diving fishing lure comprising an elongated body having a transversely arched downwardly and forwardly extending recess in its forward end, a diving plate disposed in said recess of the body and transversely arched, and upwardly extending and diverging diving wings having substantially plane water resisting surfaces carried by the sides of the diving plate and forming means whereby the lure will continue to dive as the same rolls from side to side.

3. The combination with a fishing lure, of a diving plate carried by the forward end of the body of the lure, said diving plate being provided with an inclined surface for causing the lure to dive as it moves through the water, and relatively angled wings carried by said lure diving plate having substantially plane surfaces adapted to be presented to the resistance of the water as the lure rolls from side to side.

4. The combination with the forward end of a fishing lure, of means whereby said lure will dive as it is drawn through the water and as it rolls from side to side in its movement through the water, said means comprising a downwardly and forwardly extending transversely arched plate, and upwardly and outwardly extending diverging and substantially plane diving wings carried by the sides of said plate.

5. The combination with the forward end of a body of a fishing lure, of means whereby said lure will dive as it is drawn through the water and as it rolls from side to side in its movement through the water, said means comprising an inclined plate secured to the forward end of the lure body and provided with a centrally disposed inclined diving surface for straight diving of the lure, and substantially plane angled diving surfaces on each side of the centrally disposed inclined diving surface adapted to present a forwardly and downwardly inclined surface to the resistance of the water as the lure assumes an uneven keel.

In testimony whereof I affix my signature

FRANK AUSTIN CASS.